INVENTOR.
DEWEY W. PIERCE
CHARLES J. CARMICHAEL
BY
ATTORNEY

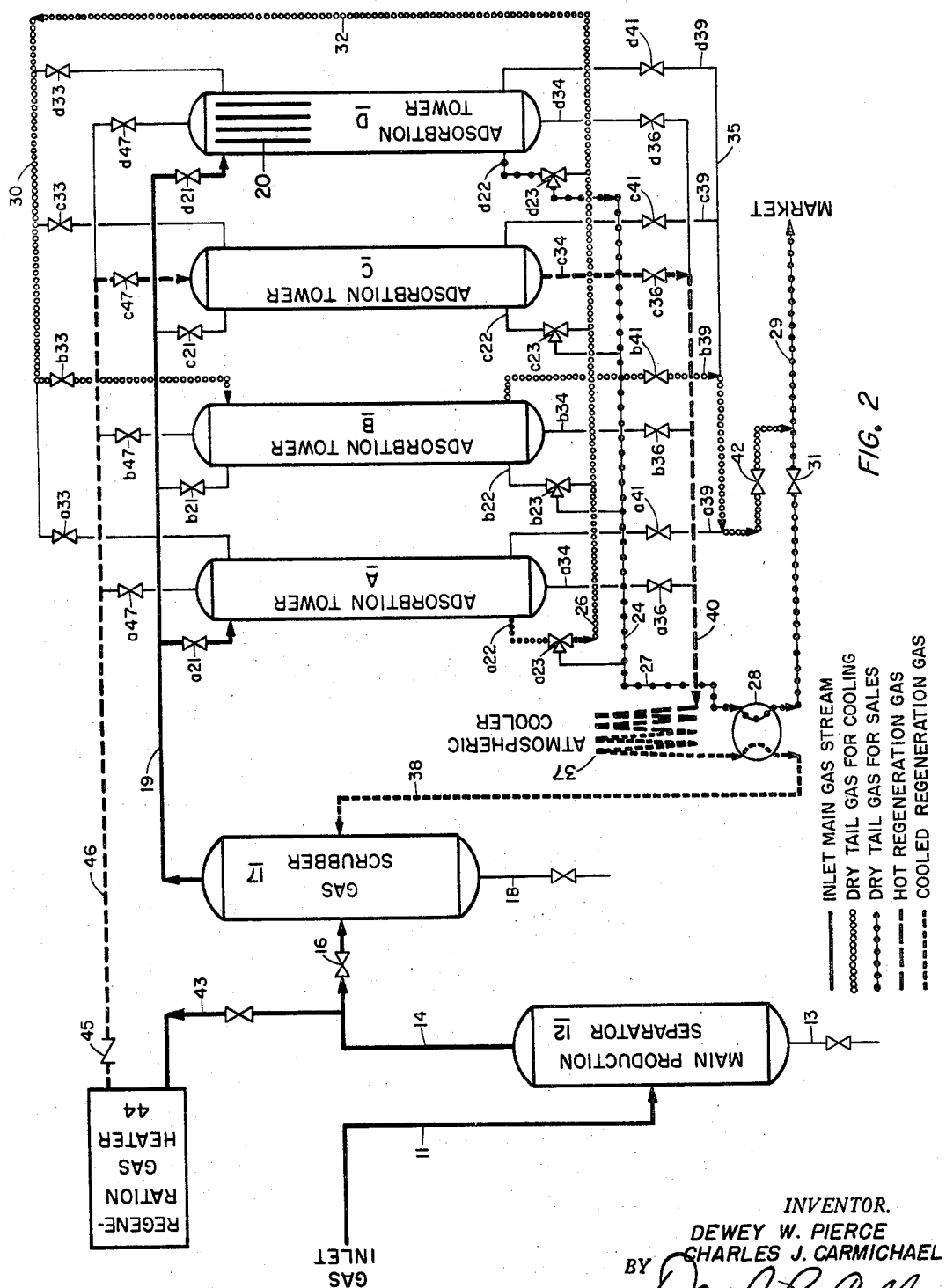
FIG. 2
INVENTOR.
DEWEY W. PIERCE
CHARLES J. CARMICHAEL
BY
ATTORNEY

April 23, 1968     D. W. PIERCE ET AL     3,378,992
GAS TREATING PROCESS UTILIZING OVERLAPPING
ADSORPTION PHASES
Filed July 17, 1964     10 Sheets-Sheet 4

INVENTOR.
DEWEY W. PIERCE
CHARLES J. CARMICHAEL
BY
ATTORNEY

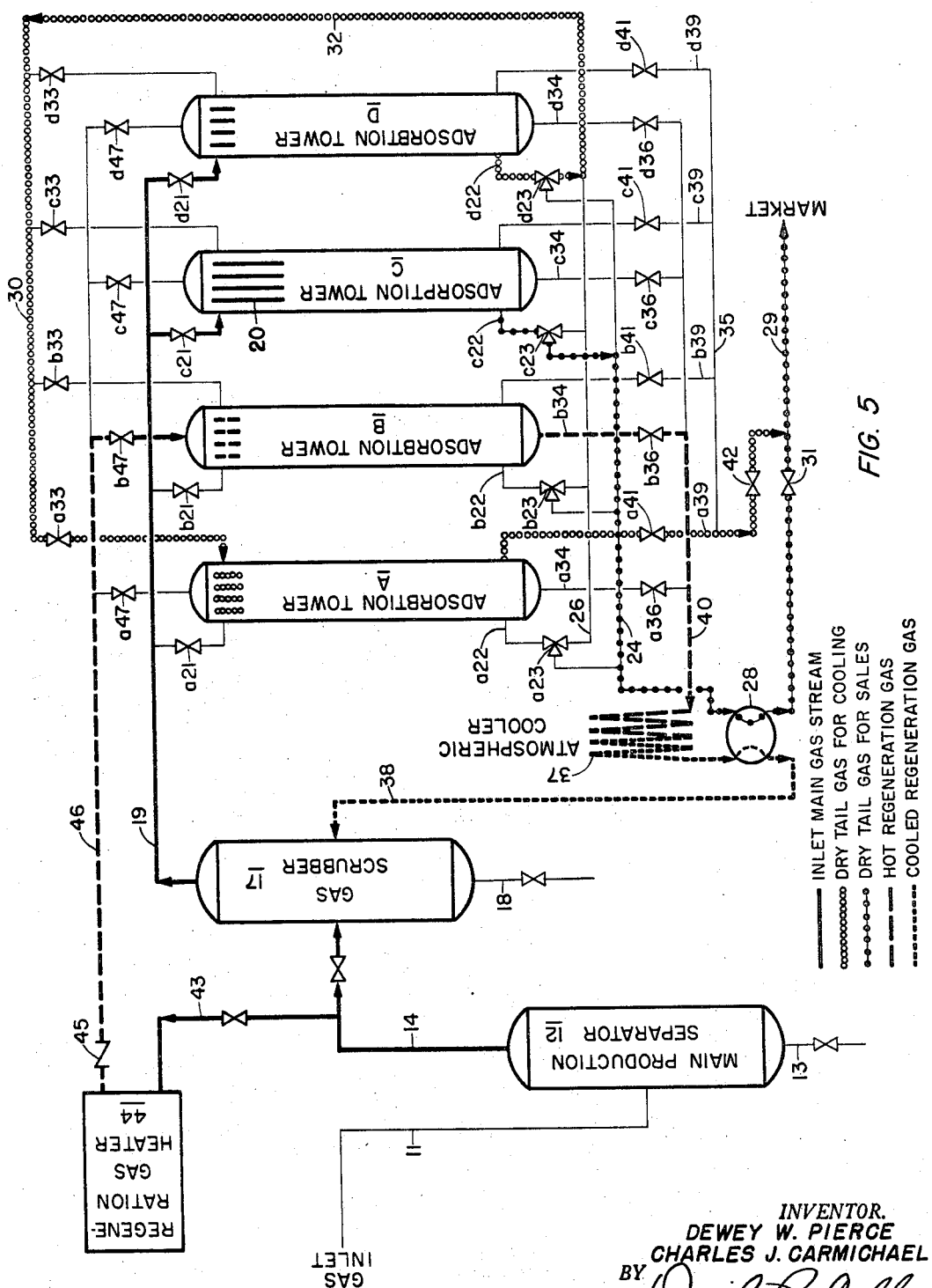
FIG. 5
INVENTOR.
DEWEY W. PIERCE
CHARLES J. CARMICHAEL
BY 
ATTORNEY

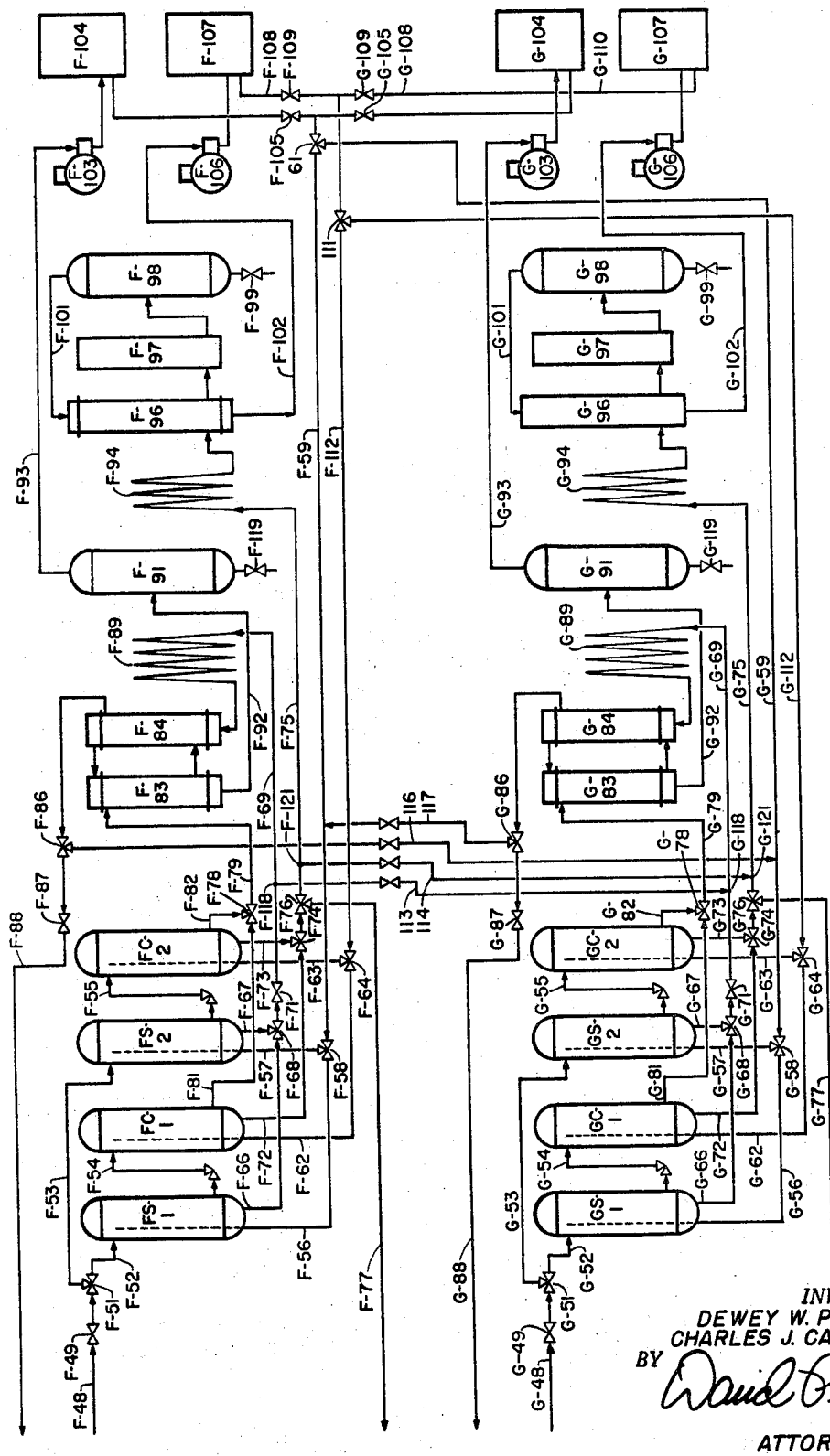
FIG. 6
INVENTOR.
DEWEY W. PIERCE
CHARLES J. CARMICHAEL
BY
ATTORNEY

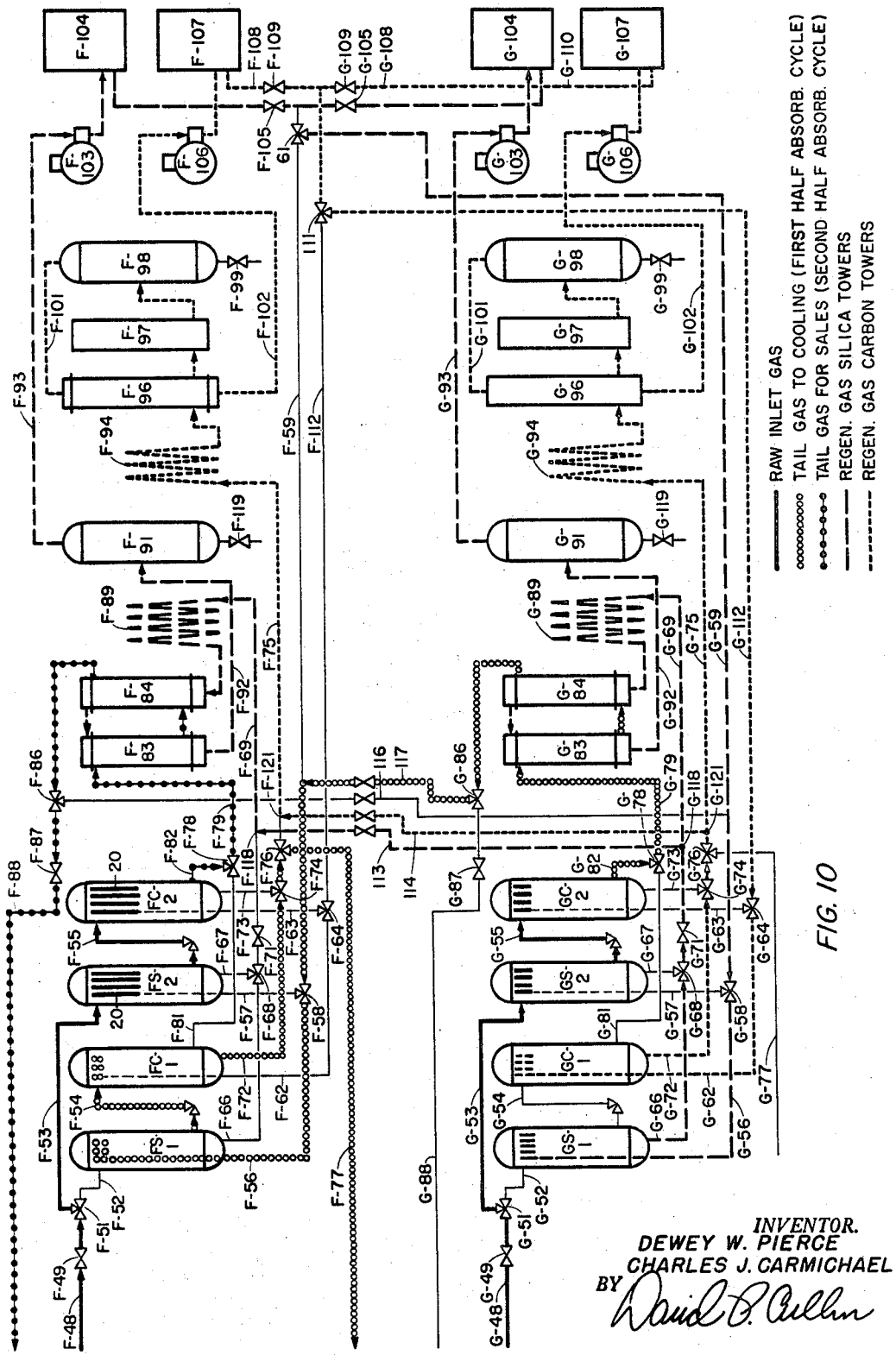

United States Patent Office 3,378,992
Patented Apr. 23, 1968

3,378,992
GAS TREATING PROCESS UTILIZING OVER-
LAPPING ADSORPTION PHASES
Dewey W. Pierce and Charles J. Carmichael, Lake
Charles, Ind., assignors to Continental Oil Company,
Ponca City, Okla., a corporation of Delaware
Filed July 17, 1964, Ser. No. 383,471
2 Claims. (Cl. 55—62)

ABSTRACT OF THE DISCLOSURE

Discloses a cyclic four-bed process for removing sorbable components from the flowing gas stream. Two of the four beds are continually in the sorption phase for two cycles, one bed lagging the other by one cycle. Effluent gas from the bed most recently placed in the sorption phase is used as a cooling gas for a hot regenerated third bed. The fourth saturated bed is regenerated in an open or closed heating circuit. Each bed may be made up of two separate sub-beds, one of carbon, the other of silica gel to selectively remove sorbable components. The like sub-beds are regenerated in separate closed circuits, the regeneration gas in each being circulated through a double set of heaters, condensers and separators hooked in parallel.

The present invention relates to processes for treating gas and, in one aspect, the invention relates to adsorption processes for removing liquefiable hydrocarbons from a gas stream.

Cyclic adsorption processes have been known for many years and have, for a substantial period of this time, been utilized for removal of normally liquid hydrocarbons from a natural gas stream. Commonly in such processes, a plurality of adsorbent beds are utilized cyclically; an incoming gas stream containing impurities being shunted from first one to another of the adsorbent beds as the previously utilized adsorbent bed becomes loaded with impurities. As a feed stream is shunted from a charged bed to a fresh adsorption bed, the bed which is loaded is regenerated by a variety of different methods. Commonly, such beds are heated to drive off the previously adsorbed impurities and are then cooled before being returned to stream flow. Because of this necessity for periodically regenerating the adsorbent beds, it has been found necessary to utilize a plurality of such beds cyclically in order to insure continuous operation of the stream.

One of the problems which has confronted the prior art practitioners has been the problem of cooling thermally regenerated beds to adsorption temperatures. Because the adsorption beds are relatively large and because economics require that the number of beds be kept at a minimum, it has not been found economically feasible to allow the beds to equilibrate to ambient temperatures without some ancillary means for cooling. In spite of the fact, however, that such ancillary cooling means are necessary, it is also true that care must be taken in choosing and using such cooling means in order to preclude any preloading of the bed with impurities during the cooling step. Heretofore, a certain amount of such preloading has been accepted as a necessary characteristic of many of the cooling processes previously used, although it has long been recognized that the elimination of such preloading would result in more uniformly pure effluent from the process.

In addition to the problems encountered in cooling thermally regenerated adsorption beds, it has also been noted that relatively long-cycle adsorption, such as is characteristic of a two-tower system, does not produce the degree of uniform results which has been found desirable. However when a three-tower system is used in order to shorten the cycle and thus increase the uniformity of effluent, it has been found that only one out of the three towers can be used to adsorb during any given period of time. The disadvantage of such a process is obvious inasmuch as two-thirds of the equipment investment is for economic purposes inactive at all times.

Until the present invention, a gas treating process characterized by efficient use of adsorption columns and further characterized by little or no preloading of the adsorption beds during the cooling step has remained a somewhat elusive desideratum.

An object of the present invention is to provide a novel, short cycle adsorption process requiring a minimum capital outlay for a maximum amount of gas processing capacity.

A further object of the present invention is to provide a cyclic gas treating process wherein preloading of thermally regenerated beds during cooling is substantially precluded.

An additional object of the invention is to provide a gas treating process, the effluent from which has a relatively low, liquefiable hydrocarbon content.

Still another object of the present invention is to provide an adsorption process for economic treatment of large volumes of gases.

A further object of the present invention is to provide an adsorption process whereby gasoline, butane and other relatively high-boiling portions of a methane gas stream may be economically recovered.

Yet another object of the present invention is to provide a gas treating process wherein an adsorption bed may be thermally regenerated and later cooled without the necessity for ancillary refrigeration equipment and without any substantial preloading of the bed during the cooling step.

One embodiment of the present invention may be summarized as a cyclic process for purifying a gas stream wherein a plurality of parallel, selective adsorption beds are provided. An incoming raw gas stream is ducted into at least two of the adsorption beds, one of which is in the first half of an adsorption step while the other is in the second half of an adsorption step. Simultaneously, regeneration gas is heated and passed through a previously loaded bed for the purpose of regenerating the bed, while at the same time the tail gas from the adsorption bed undergoing the first half of the adsorption step is utilized to cool a previously thermally regenerated adsorption bed.

Other objects of the present invention will become apparent from a reading of the following detailed description when read in conjunction with the following drawings wherein:

FIGURES 2–5 are the same diagram shown in FIGURE 1, indicating the active flow lines during four successive steps in a single cycle of the operation of the elements shown in FIGURE 1.

FIGURE 6 is a schematic flow diagram of an additional embodiment of the present invention, wherein four groups of two adsorption towers each are utilized cyclically in an adsorption process which utilizes a closed cycle regeneration loop.

FIGURES 7–10 are the same diagram shown in FIGURE 6, indicating the active flow lines during four successive steps in a single cycle of the operation of the elements shown in FIGURE 6.

Figure 1:
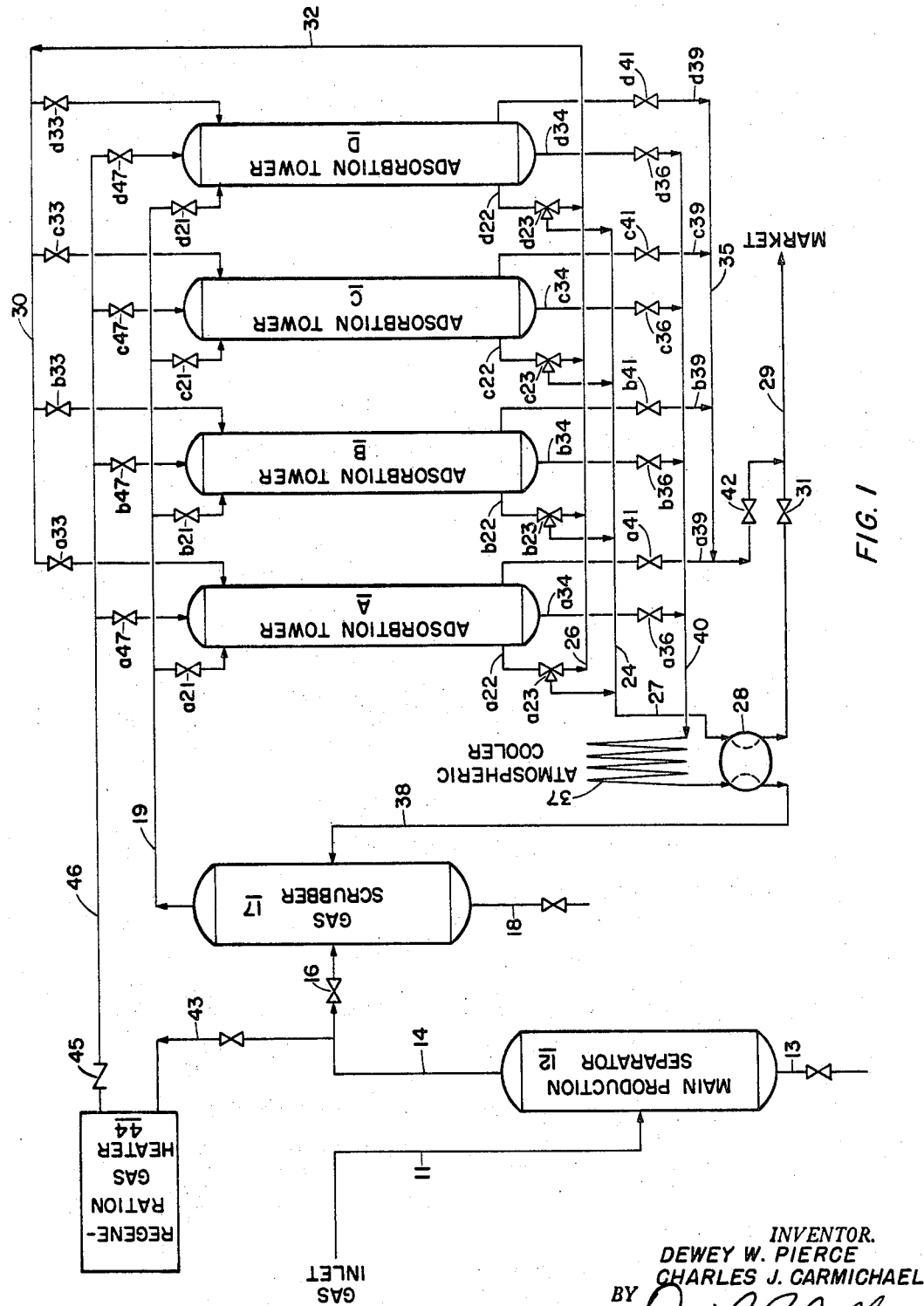
FIGURE 1 is a schematic flow diagram of one embodiment of the present invention which utilizes four cyclically operated adsorption columns operating within an open cycle regeneration loop.

Turning now to the drawings and more particularly to FIGURE 1, there is shown schematically one possible arrangement of apparatus which may be utilized in practicing the present invention for the purification of a stream of gaseous material such as natural gas. Included are a plurality of means, such as, four adsorption columns designated A, B, C and D, for removing impurities, such as, water, gasoline and higher boiling hydrocarbon constituents from the natural gas stream, which columns are operated cyclically in a manner to be pointed out in more detail hereinafter. In order to more effectively describe the apparatus and operation of the present embodiment of the invention, the valves and related flow lines hereinafter described will be given a letter prefix corresponding to the particular adsorption column with which they are associated. In some cases, a given valve or flow line will not be associated with any particular adsorption column and will, under such circumstances, merely be indicated by a numbered designation.

A feed stream, containing natural gas, water, higher hydrocarbons and the like, is introduced to the apparatus through a feed line 11 from which it passes directly into separating means, such as, a production separator 12 which removes liquid constituents, such as, water, heavier liquid hydrocarbons and the like which occur in the feed stream passing through line 11. Separator 12 may be any one of several types well known in the art which function in the desired manner, and in general, will comprise a large chamber which allows gravity differentiation between the constituents coming thereinto. At the lower portion of separator 12 is a valved conduit 13 by means of which liquids are removed from the separator. Opposite conduit 13 at the upper end of separator 12 is a gas line 14, the interior of which communicates through a valve 16 with the interior of means for removing liquids from a regeneration gas stream, such as, a gas scrubber 17. Liquid constituents isolated in scrubber 17 are removed therefrom by a valved conduit 18.

From gas scrubber 17, the gas stream flows through an adsorption unit inlet line 19, alternately, to the various adsorption units A, B, C or D. The flow of gas from line 19 to a given adsorption unit is controlled by a series of valves $a21$, $b21$, $c21$ and $d21$, two of which are closed and two of which are open at any given time in the process, as will be described in greater detail hereinafter.

At the lower portion of the adsorption towers are outlet conduits $a22$, $b22$, $c22$ and $d22$ which lead into three-way valves, $a23$, $b23$, $c23$ and $d23$. Three-way valves 23 function to direct tail gas from the adsorption units to a header 26 when the tail gas is from the first half of an adsorb step or, alternately, to a header 24 when the tail gas is from the second half of an adsorb step. Header 24 communicates via conduit 27 with a heat exchanger 28 and from thence to a marketing supply line 29 containing a valve 31. Similarly, header 26 communicates through a conduit 32 and a second header 30 with a plurality of valves $a33$, $b33$, $c33$ and $d33$ which operate to place header 26 in communication with the upper portion of one of the adsorption columns at any given time.

Looking again at the bottom portions of the adsorption columns, there is provided additional outlets $a34$, $b34$, $c34$ and $d34$ which communicate through valves $a36$, $b36$, $c36$ and $d36$, respectively, with an ambient temperature heat exchanger 37 through a header 40. Gases flowing from heat exchanger 37 pass through heat exchanger 28 and from thence to gas scrubber 17 through a conduit 38. A third set of outlet lines $a39$, $b39$, $c39$ and $d39$ having therein valves $a41$, $b41$, $c41$ and $d41$, respectively, are also provided at the lower portion of the adsorption columns A, B, C and D, respectively. Gas passing through the adsorption columns in the last one-half of an adsorb step is removed from the columns through the conduits 39, a header 35 and through a valve 42 to pass to the market supply line 29.

In the form shown in FIGURE 1, the present invention contemplates that a portion of the incoming gas feed will be utilized in an open regeneration cycle and, to this end, a valved conduit 43 is provided upstream from valve 16. Gases flowing into conduit 43 pass into a heater 44 where they are heated to regeneration temperatures, and subsequently passed through a valve 45 into regeneration gas line 46, which is placed in communication with one of the adsorption columns A, B, C or D by the manipulation of various ones of a set of valves $a47$, $b47$, $c47$, and $d47$, respectively.

*Operation of the apparatus shown in FIGURES 1–5*

As was pointed out previously, the apparatus disclosed in FIGURES 1–5 represents an embodiment of the present invention which utilizes an open cycle regeneration loop. Cooling of a previously regenerated adsorption tower is accomplished by the first one-half of the tail gas from a parallel tower which is on an adsorb step of the cycle of operation of the apparatus. The following detailed description of the operation will be given as of the beginning of the step in the cycle shown in FIGURE 2. It will be understood that the cycle progresses serially through the flow paths shown stepwise in FIGURES 2–5. Each such step will be maintained for a predetermined period of time which will vary depending upon several factors, such as, inlet gas composition, desired purity of tail gas, ambient temperature, column packing and the like. In the present example, it will be assumed that each step in the cycle lasts for ten minutes, although it is to be understood that the value is typical rather than limiting. While in general it may be said that a more uniform product results from a shorter cycle, nevertheless, the steps in the cycle may last from about 8 to about 15 minutes with good results, moreover, values outside this range may be utilized with some advantage. For present purposes, an incoming flow rate of 50,000 m.c.f./d. will be assumed.

The raw feed gas containing natural gas, water, higher hydrocarbons and the like is brought into the system at a temperature of from about 60° F. to about 90° F. and at a pressure of from about 750 p.s.i.g. to about 1,050 p.s.i.g. through feed line 11 which communicates with the central interior portion of production separator 12. In the embodiment shown, separator 12 comprises a closed vessel having an open interior arranged so that any entrained liquids within the raw inlet gas will, by the action of gravity, fall to the bottom of the separator to be later removed through valved conduit 13. The gaseous portion of the incoming stream simultaneously passes upwardly through gas line 14 and the bulk of the stream subsequently passes valve 16 into the interior of gas scrubber 17 wherein any liquid mist which carried over from separator 12 is stripped from the main gas stream and where the liquid-laden regeneration gas is stripped of its liquids after which it rejoins the main gas stream for processing.

On leaving gas scrubber 17, the gas stream passes into inlet line 19 at a pressure about 50 p.s.i. less than inlet pressure and at a temperature of from about 70° F. to about 90° F. As indicated in FIGURE 2, during the first step in the cycle, valves $b21$ and $c21$ are closed while valves $a21$ and $d21$ are open so that the incoming gas stream splits into two approximately equal streams, one flowing into the upper portion of adsorption column A which is on the first half of an adsorb step, while the other portion of the split gas stream enters the upper portion of adsorption column D which is in the second half of an adsorption step as indicated by the parallel bars 20 through out the drawings. The gas entering adsorption column A passes therethrough whereupon, the hydrocarbon fractions thereof containing from about $C_3$ to about $C_{6+}$ are adsorbed on the column packing and thus removed from the flowing stream. On leaving adsorption column A, the purified tail gas passes out through conduit $a22$ and three-way valve $a23$ into header 26. Continuing from header 26, the tail gas travels through conduit 32 into header 30 and from thence through valve b33 into the upper portion of adsorption column B which was regenerated in the last step of a cycle just previous to that step shown in FIGURE 2. On entering adsorption column B which is at a temperature of from about 500° F. to about 600° F., the tail gas is at a temperature of from about 70° F. to about 100° F. and at a pressure about 70 p.s.i. less than inlet pressure. The tail gas temperature is raised within adsorption column B until, upon emerging therefrom, it is at a temperature of from about 400° F. to about 500° F. and at a pressure of about 90 p.s.i. less than inlet pressure while the temperature of the column has been reduced to from about 200° F. to about 150° F. As the now heated tail gas leaves adsorption column B it passes through valve b41 into header 35, from thence through valve 42, and ultimately to marketing supply line 29.

A similar, simultaneous flow pattern may be traced through adsorption column D which receives approximately one-half of the flow stream entering from inlet line 19 through valve d21. Adsorption column D is, as shown in FIGURE 2, on the second half of the adsorb step, that is, under the assumed conditons, it is in the second ten minutes of adsorption. Because only the first half of the tail gas from the adsorption step is utilized for cooling, the tail gas flowing from column D passes directly to market supply line 29 through outlet conduit d22 and three-way valve d23 which is positioned so as to direct the flow of gas into header 24. In passing from header 24 to valve 31 located in line 29, the tail gas from the second half of the adsorption step passes in heat exchange relationship with impurity-laden regeneration gas from column B passing through heat exchanger 28. Just prior to entering heat exchanger 28, the tail gas from column D is at a temperature from about 70° F. to about 100° F. and at a pressure about 70 p.s.i. less than inlet pressure. Upon emerging from heat exchanger 28, this tail gas has been increased in temperature to within the range of from about 80° F. to about 110° F. and has decreased in pressure to about 20 p.s.i.

It was mentioned previously that the apparatus disclosed in FIGURES 1–5 utilizes an open cycle regeneration loop. Gas for this purpose is removed from line 14 through valved conduit 43 at a temperature from about 60° F. to about 90° F. and at a pressure from about 750 p.s.i.g. to about 1050 p.s.i.g. The raw inlet gas in conduit 43 is ducted into heater 44 wherein it is heated to a temperature of from about 500° F. to about 600° F. and emerges through valve 45 at a pressure about 10 p.s.i. lower than that at which it entered the heater. In the portion of the cycle shown in FIGURE 2, the heated regeneration gas passes through regeneration gas line 46 and open valve c47 into the upper portion of adsorption tower C which has just completed a twenty-minute adsorption step. As the heated gas moves downwardly through column C, it becomes cooled and simultaneously vaporizes $C_3$ to $C_{6+}$ hydrocarbons which have been previously adsorbed on the packing within the column, which hydrocarbons are then removed by the flowing gas stream. On passing from column C through outlet c34, the $C_{3+}$-laden regeneration gas is at a pressure about 10 p.s.i.g. lower than that at which it entered column C and at a temperature of from about 200° F. to about 500° F. Upon leaving outlet c34, the regeneration gas passes through valve c36 into header 40 from which it is ducted into atmospheric cooler 37, from which it emerges at a temperature from about 100° F. to about 150° F. and at a pressure about 15 p.s.i.g. lower than that at which it entered the cooler. A second stage of cooling is provided for the regeneration gas in heat exchanger 28 wherein the temperature of the gas is reduced to within the range of from about 70° F. to about 90° F. and the pressure is reduced about 15 p.s.i.g. Under these conditions, the $C_3$ to $C_{6+}$ hydrocarbon fractions which were removed by the gas during the regeneration step are liquefied and in their liquefied state are entrained in the flowing gas stream and carried thereby through conduit 38 into the central interior portion of gas scrubber 17, wherein they collect at the bottom and are ultimately removed through valved line 18.

Figure 3:
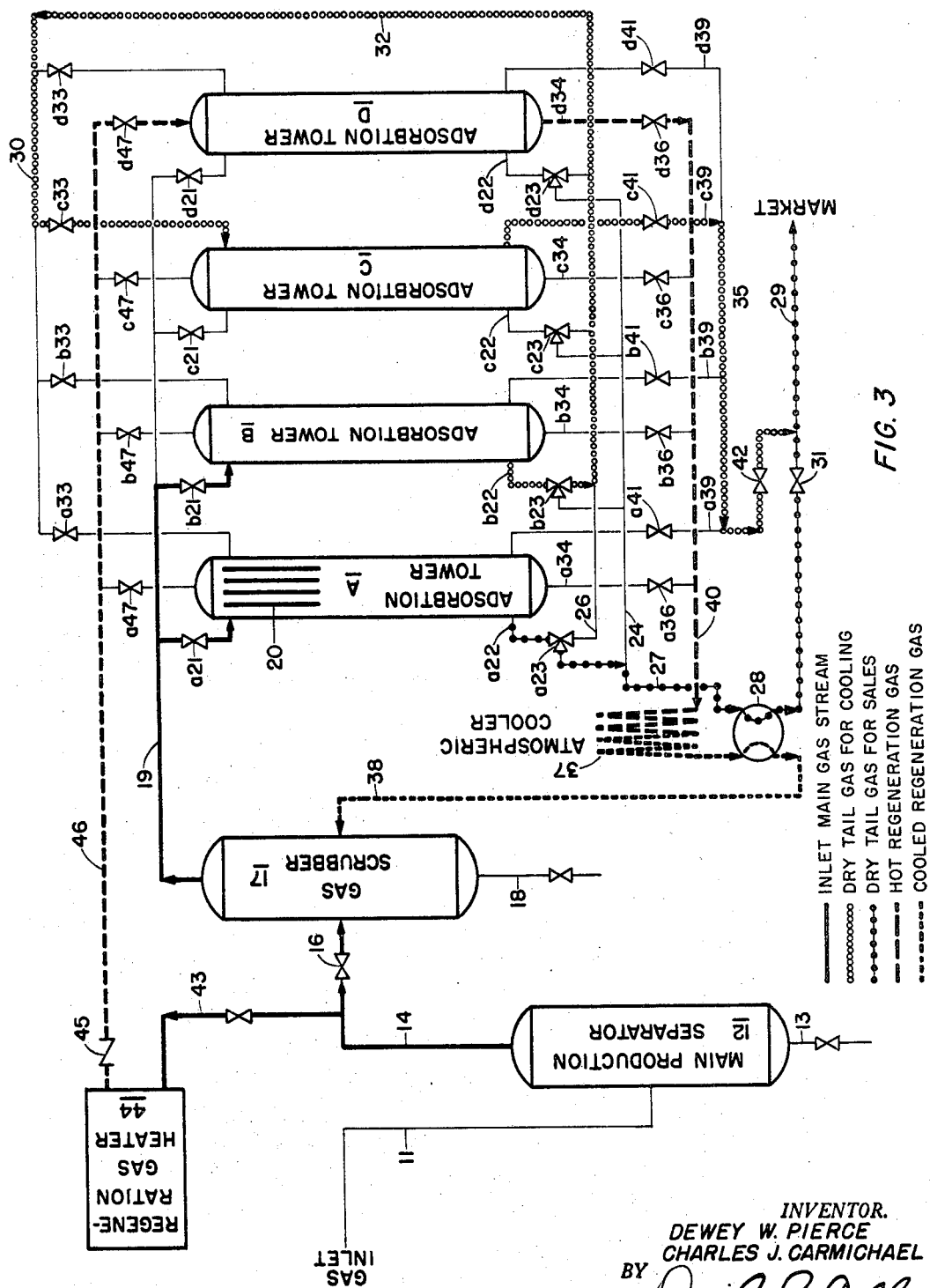

After the flow conditions as shown in FIGURE 2 have been established for ten minutes (under prevailing assumptions) suitable valving is actuated to re-establish the flow conditions as shown in FIGURE 3. Under such conditions, adsorption column A continues into the second half of the adsorb step while previously cooled adsorption column B begins adsorption and heated regeneration gas is ducted into the now saturated adsorption column D. Adsorption column C is, in this step of the cycle, undergoing cooling from the tail gas emerging from adsorption column B which, as was stated, is in the first half of the adsorb step.

Figure 4:
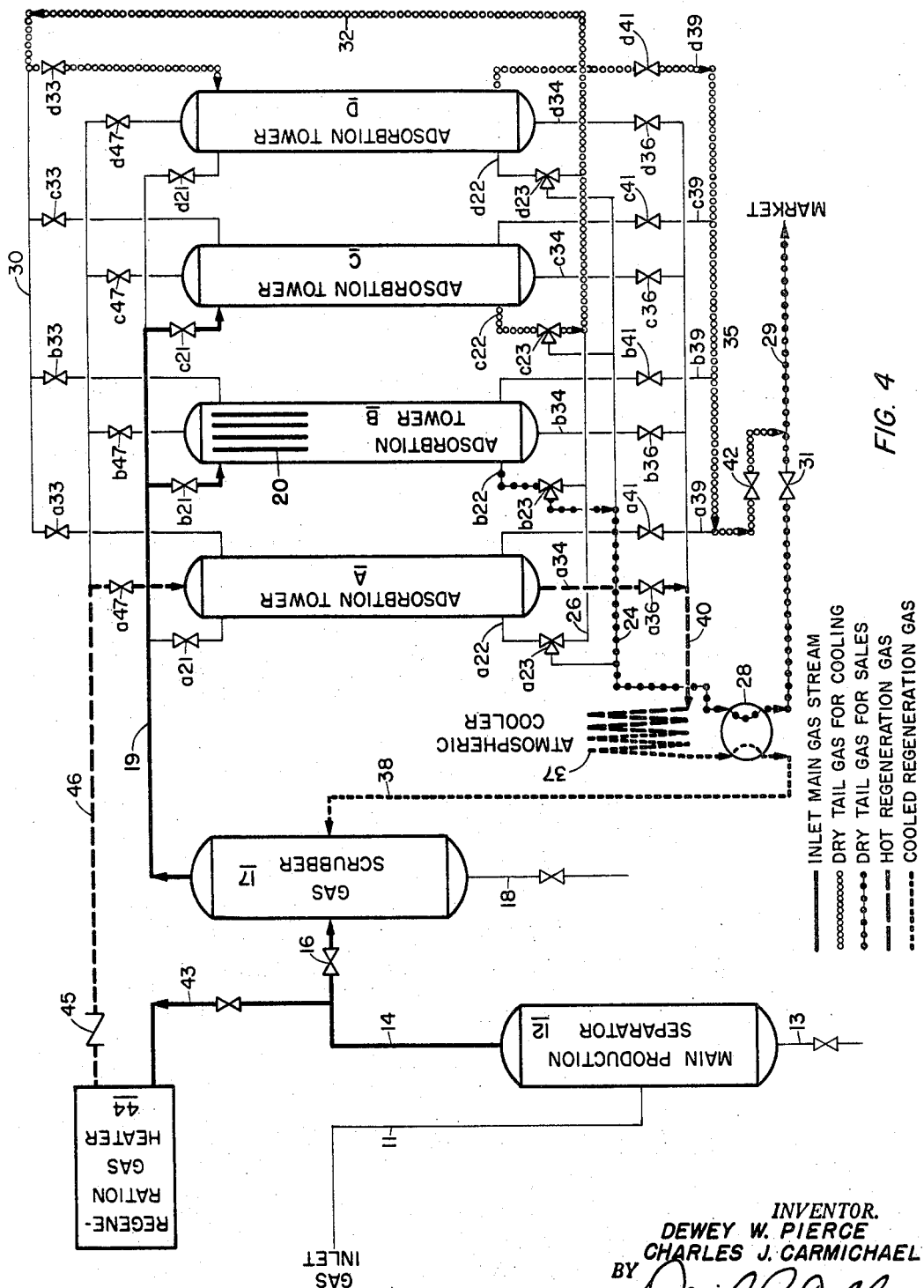

Again after a lapse of time of ten minutes, the flow conditions are once more re-established, this time in the pattern shown in FIGURE 4 wherein adsorption columns B and C are in the second and first half of the adsorb cycle, respectively. Column A is now being thermally regenerated and adsorption column D is undergoing cooling from the tail gases flowing from adsorption column C.

In the last step of the complete cycle, the flow pattern is established as is shown in FIGURE 5 after a time interval of ten minutes in the pattern shown in FIGURE 4, and in this adsorption column D is beginning the first half of an adsorb step, while adsorption column C is beginning the second half of the adsorb step. Simultaneously, adsorption column B is undergoing regeneration and adsorption column A is undergoing cooling from the tail gas flowing from adsorption column D.

It will, of course, be understood that the general temperature and pressure ranges given in the detailed description of the flow pattern in FIGURE 2 also characterize corresponding portions of the equipment in the other three later steps in the cycle.

*Example*

In the general description of the operation of the equipment shown in FIGURES 1–5 which was given immediately above, general ranges of pressures and temperatures were indicated for various positions in the flow diagram. By way of specific example let is be assumed that a raw gas is provided which has the composition presented in Table I. Let it also be assumed that this raw gas is treated utilizing 10 minute treating steps by the apparatus shown in FIGURE 1 to prepare a substantially pure natural gas stream.

TABLE I

Inlet gas composition, mol percent:

| | |
|---|---|
| $C_1$ | 95.81 |
| $C_2$ | 2.42 |
| $C_3$ | 0.89 |
| $iC_4$ | 0.28 |
| $nC_4$ | 0.22 |
| $iC_5$ | 0.09 |
| $nC_5$ | 0.06 |
| $C_{6+}$ | 0.23 |

Specific conditions which characterize a typical, specific operation for treating the above gas are summarized in Table II, wherein the pressure and temperature at various points in the flow pattern are indicated as occurring just as the flow stream leaves the tabulated equipment elements. Specifically, these conditions characterize the process conditions at the beginning of the step shown in FIGURE 2.

TABLE II

|  | Temperature, °F. | Pressure, p.s.i.g. | Flow Rate, MCF/D |
|---|---|---|---|
| Feed line 11 | 60 | 951 | 50,000 |
| Production Separator 12 | 60 | 950 | 50,000 |
| Gas scrubber 17 | 70 | 900 | 50,000 |
| Adsorption column A | 80 | 880 | 25,000 |
| Adsorption column D | 80 | 880 | 25,000 |
| Adsorption column B | 500 | 860 | 25,000 |
| Heat exchanger 28 (entering valve 31) | 80 | 860 | 25,000 |
| Heater 44 | 600 | 940 | 15,000 |
| Adsorption column C | 110 | 930 | 15,000 |
| Atmospheric heat exchanger 37 | 90 | 915 | 15,000 |
| Heat exchanger 28 (entering conduit 38) | 80 | 900 | 15,000 |

On treatment the raw gas of the composition shown in Table I typically will have the compositions shown in Table III at various times during the adsorbent step.

TABLE III.—COMPOSITION OF OUTLET GAS

| Sample Time | Tail gas used for cooling | | | 14 min. | 20 min. |
|---|---|---|---|---|---|
| | 2 min. | 6 min. | 10 min. | | |
| $C_1$ | 96.88 | 96.54 | 95.99 | 95.94 | 95.82 |
| $C_2$ | 2.53 | 2.35 | 2.65 | 2.63 | 2.63 |
| $C_3$ | 0.52 | 0.88 | 0.99 | 1.00 | 1.01 |
| $iC_4$ | 0.05 | 0.15 | 0.23 | 0.25 | 0.30 |
| $nC_4$ | 0.02 | 0.08 | 0.15 | 0.17 | 0.20 |
| $iC_5$ | 0 | 0 | 0 | 0.01 | 0.03 |
| $nC_5$ | 0 | 0 | 0 | 0 | 0.01 |

*Description of the closed cycle regeneration apparatus shown in FIGURES 6–10*

Turning now to FIGURE 6, there is shown a flow diagram of an alternate form of apparatus for practicing the present invention which includes provision for closed regeneration loops. In general, the flow diagram shown in FIGURE 6 includes a plurality of pairs of silica gel and carbon adsorption beds which are alternately utilized for adsorption and which are then cyclically regenerated and cooled. In this flow scheme, means comprising separate closed loops are provided for regenerating the two types of adsorption beds. In addition, this flow sheet discloses two substantially identical sets of equipment which, for clarity, have been indicated generally as F and as G. In the following description of the elements of this diagram, numbers only will be assigned to the various portions of the equipment appearing in the written specification. However, where applicable, the various numbers assigned to the different elements of the flow diagram will be preceded by either an F or a G when they appear in the drawings. Likewise, in the later description of the operation of this apparatus, the elements under discussion at any particular time will be identified not only by the number assigned, but also by the appropriate letter designation to indicate the group in which the particular element under discussion falls.

In each of the groups F and G, there is an inlet line 48 which passes through a valve 49 which leads into a three-way valve 51. The interior of valve 51, in turn communicates alternately with adsorption means, such as, a pair of silica towers S–1 and S–2 through lines 52 and 53, respectively. Other adsorption means, such as, a pair of carbon towers C–1 and C–2 are provided in paired arrangement with silica towers S–1 and S–2, respectively, and communicate therewith through valved lines 54 and 55, respectively. A pair of conduits, 56 and 57, lead from columns S–1 and S–2, respectively, and terminate in a three-way valve 58, which is in a line 59 with a second three-way valve 61. Additionally, a similar pair of conduits, 62 and 63, also communicate with the interior of columns C–1 and C–2, respectively, and likewise terminate in a three-way valve numbered 64. Another series of conduits is provided in communication with the lower portion of the columns S–1 and S–2. As shown in FIGURE 6, these conduits leading to columns S–1 and S–2, respectively, are numbered 66 and 67 and terminate in a three-way valve 68 situated in a flow line 69 which also contains an additional valve 71. Identical flow lines 72 and 73 are provided for columns C–1 and C–2, respectively, and these flow lines terminate in a three-way valve 74, one segment of which communicates with a similar three-way valve 76 in an outlet line 77. An additional three-way valve 78 is provided in a flow line 79 and functions to place flow line 79 alternately in communication with exit conduits 81 and 82 located at the lower portion of columns C–1 and C–2, respectively.

Fluid flowing through line 79 is passed through the twin columns 83 and 84 of a gas-to-gas heat exchanger and from thence through a three-way valve 86 and an on-off valve 87 in a discharge line 88. In addition, the interior of heat exchange column 84 is in communication with an atmospheric cooler 89 which receives gas from flow line 69. Similarly, the interior of heat exchange column 83 is in communication with the central interior portion of a gasoline separator 91 through a conduit 92. Leading from gasoline separator 91 to blower 103 is a return conduit 93 for cooled regeneration gas from the silica towers.

Cooling and purification for regeneration gas coming from the carbon towers is also provided in the flow diagram showed in FIGURE 6. More particularly, means for cooling and removing previously adsorbed materials from the carbon regeneration gas comprises an atmospheric cooler 94 which communicates through a line 75 with three-way valve 76 on the upstream end of the cooler and, on the downstream side, a precooler 96. Downstream from precooler 96 is a chiller 97 from which fluid is flowed to an LPG separator 98. Within separator 98, liquid petroleum gas accumulates in the bottom and is subsequently withdrawn through a valved line 99 while the now purified carbon regeneration gas leaves separator 98 through the upper portion thereof out through a conduit 101 leading back through precooler 96 wherein it picks up heat from the fluid arriving in precooler 96 from atmospheric cooler 94. An exit line 102 is provided at the bottom of precooler 96 for removal of fluids flowing thereinto from conduit 101.

In addition to the apparatus for cooling and purifying the gas in the closed cycle regeneration loops, means are also provided for circulating such gas and for heating the gas after it has been purified. More particularly, in the silica column regeneration loop there is provided a blower 103 which communicates with a heater 104 wherein the regeneration gas is heated just prior to recirculation through a line 110 and valve 105 into a previously loaded silica column. A similar blower 106 and heater 107 are also provided in the carbon regeneration gas loop in direct communication with exit line 102 and a return conduit 108 having a valve 109 therein. A three-way valve 111 is likewise provided downstream from heater 107 and communicates with three-way valve 64 through a return line 112.

The two sets of substantially identical process equipment F and G are in communication, among other means, through a series of valves. Thus, as shown in FIGURE 6, lines F–69 and G–69, F–75 and G–75, F–59 and G–59, and F–112 and G–112 communicate with each other respectively through valved lines 113, 114, 116 and 117. Communication between lines 69 and 113 and between lines 75 and 114 is through junctions 118 and 121, respectively.

*Operation of the embodiment disclosed in FIGURES 6–10*

Figure 7:
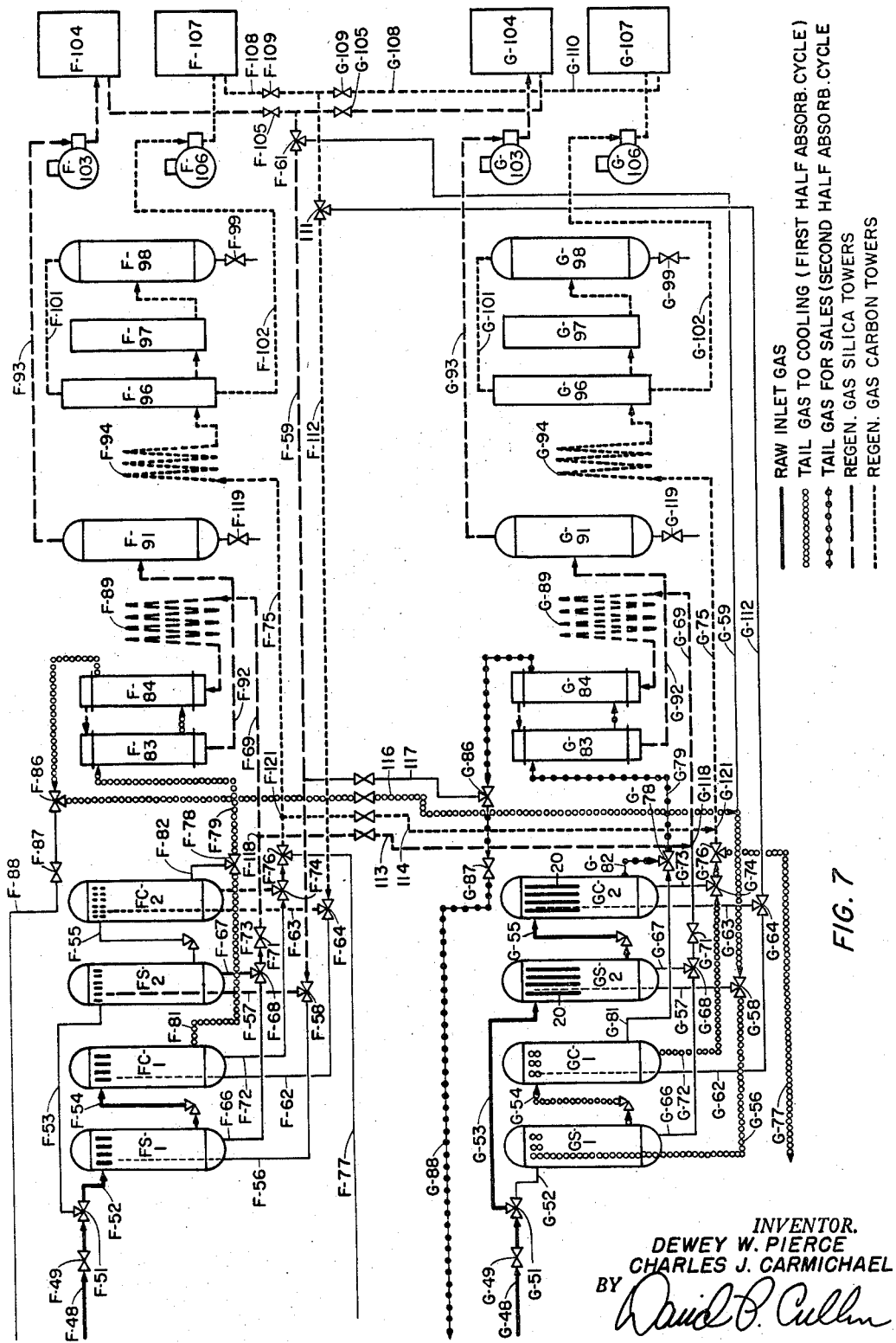

The equipment shown in FIGURES 6–10 is designed for continuous cyclic operation with a closed regeneration loop. Because the flow process is a continuous one, it will be necessary to assume, for the purposes of this description, a time for starting. Moreover, it will be necessary to assume a certain length of cycle so that the various stages within the process can be mutually related. For these purposes, it will be assumed that any given adsorption bed will be on stream for 30 minutes. In addition, it will be assumed that the conditions shown in FIGURE 7 are the conditions at the starting point of a cycle. At the time illustrated by FIGURE 7, columns FS-1 and FC-1 are just beginning the adsorption cycle while columns FS-2 and FC-2 have completed an adsorption step and are just beginning to be thermally regenerated by the closed regeneration gas. Column GS-1 and GC-1 have been thermally regenerated and are being cooled by tail gas from columns FS-1 and FC-1 while columns GS-2 and GC-2 are continuing into the second phase of an adsorption step.

Looking first at the group of equipment designated generally as F, it will be seen that inlet gas, containing natural gas, water, gasoline, and limited amounts of higher hydrocarbons, enters the equipment through inlet F-48 and valve F-49. From thence it is directed past three-way valve F-51, conduit F-52 into the upper portion of silica column FS-1, at a temperature between about 60° F. and about 90° F. and at a pressure from about 750 p.s.i.g. to about 1050 p.s.i.g. As the inlet gas passes through silica column FS-1, gasoline and other $G_5$ to $C_{7+}$ hydrocarbons are adsorbed on the silica gel therein and are removed from further transport by the flow of the gas. Upon leaving column FS-1, the feedstream passes through valved line F-54 into the upper portion of the carbon-packed column FC-1 at a temperature of from about 65° F. to about 95° F. and at a pressure about 10 p.s.i.g. lower than inlet pressure. Within column FC-1 the feedstream loses substantially all of its $C_3$ to $C_5$ hydrocarbon, referred to generally as LPG, to the adsorptive action of the charcoal packing of the column.

Subsequently, the now purified feedstream, which consists primarily of methane and ethane, together with some impurities, such as, nitrogen, hydrogen sulfide, and depending upon the original feedstream composition, minor amounts of higher hydrocarbons, is utilized to cool the previously thermally regenerated adsorption beds. To this end, the tail gas from columns FS-1 and FC-1 is directed, at a temperature between about 70° F. and about 100° F. at a pressure about 10 p.s.i.g. less than that at which it entered FC-1, through exit conduit 81, three-way valve 78 and line 79 into the upper portion of heat exchange column 83. As the tail gas passes through the heat exchange columns 83 and 84, it exchanges heat with the silica regeneration gas and it reaches three-way valve 86 at a temperature of from about 90° F. to about 110° F. and at a pressure about 5 p.s.i.g. less than that at which it entered the exchanger. Valve 86 is so positioned as to direct the flow of the tail gas downwardly as viewed in FIGURE 6 through valved line 116 into line G-59 past valve G-58 and into the upper portion of silica gel column GS-1 through conduit G-56. At this stage in the process, the temperature of columns GS-1 and GC-1 has been elevated to a point between about 500° F. and about 600° F. due to the thermal regeneration of these two columns in a step in the cycle immediately before. Consequently, when the cooled tail gas enters the upper portion of column GS-1, it becomes heated with a resulting cooling of the column to a temperature of from about 200° F. to about 250° F. After entering the upper portion of column GC-1 from column GS-1 via valve line G-54, the tail gas is removed therefrom through flow line G-72 at a temperature of from about 300° F. to about 500° F. and at a pressure about 20 p.s.i.g. less than that at which it entered GS-1. Subsequently, the now hot tail gas flows through three-way valves G-74 and G-76 and through outlet line G-77 to a cooler, not shown, wherein the temperature of the heated tail gas is reduced to from about 100° F. to about 200° F., after which it is directed to a marketing supply line.

In addition to the feed gas flowing through inlet F-48, there is a simultaneous flow of feed gas through the corresponding inlet G-48 and its associated valves G-49 and G-51. Upon entering valve G-51, the inlet stream is directed through line G-53 into the upper portion of silica gel column GS-2 at a temperature of from about 60° F. to about 90° F. and at a pressure of from about 750 p.s.i.g. to about 1050 p.s.i.g. The feedstream passes through columns GS-2 and GC-2 and from thence out exit conduit G-82 into valve G-78. As in the case of columns FS-1 and FC-1, gasoline, water and heavier hydrocarbons are removed from column GS-2 while lighter hydrocarbons, from about $C_3$ to about $C_5$, are removed by the carbon material packed within column GC-2. As a result of this adsorption, the material from the tail gas from column GC-2 comprises methane with minor amounts of heavier hydrocarbons together with impurities, such as, nitrogen, hydrogen sulfide and the like, which may be contained within the original feedstock.

Since columns GS-2 and GC-2 are in the second half of the adsorb step of the cycle, the tail gas flowing from the two columns is not utilized to cool a previously regenerated bed, but is rather sent directly to a disposal line after being utilized to cool the silica regeneration gas flowing through the closed silica gel regeneration loop. This heat exchange is accomplished in gas to gas heat exchange columns 83 and 84, the temperature of the incoming tail gas being from about 70° F. to about 100° F. at a pressure of from about 730 p.s.i.g. to about 1030 p.s.i.g. On emerging from heat exchange column G-84, the tail gas has attained a higher temperature of from about 90° F. to about 110° F. and passes at this temperature through three-way valve G-86 and on-off valve G-87 into discharge line G-88.

While beds FS-1 and FC-1 and beds GS-2 and GC-2 are on the adsorb portion of the cycle, beds FS-2 and FC-2 are undergoing thermal regeneration. As contemplated by the present embodiment of the invention, a closed regeneration gas loop is provided for the silica gel beds, while a separate, closed regeneration gas loop is provided for the carbon beds. Considering first the silica gel regeneration gas loop, the attention of the reader is directed to the upper right hand portion of FIGURE 6 wherein it will be seen that there is provided a blower F-103 which directs recently purified silica gel regeneration gas to a heater F-104. Gas emerges from heater F-104 at a temperature of from about 500° F. to about 600° F. and at a pressure from about 780 p.s.i.g. to about 1080 p.s.i.g., and passes therefrom through conduit F-110 and valve F-105 into the interior of three-way valve 61. Simultaneously, identical equipment in the G group of equipment also operates. Thus it will be seen that blower G-103 conducts gas into heater G-104, and from thence the gas passes through valve G-105 after which it mixes with gas flowing through valve F-105 and passes together therewith into the interior of valve 61. It will, of course, be understood that the same temperature and pressure conditions described for heater F-104 are also characteristic of heater G-104. Valve 61 is so positioned that the heated regeneration gas passes through line F-59 and three-way valve F-58 from which it is ducted upwardly through conduit F-57 into the upper portion of silica gel column FS-2. Since the heat loss between column FS-2 and heaters 104 can be disregarded for practical purposes, the temperature of the entering regeneration gas is from about 500° F. to about 600° F. and is at a pressure from about 780 p.s.i.g. to about 1080 p.s.i.g. The regeneration gas then flows through column FS-2 and out through conduit F-67 to three-way valve F-68. Flow of regeneration gas through any given column, in the present case column FS-2, is continued during the total time necessary for the completion of one step in the overall cycle, in the present case, 15 minutes. At the end of this time, the newly regenerated column has achieved a temperature of from approximately 450° F. to about 550° F. Upon passing through three-way valve F-68, at a temperature from about 400° F. to about 500° F. and at a pressure from 5 p.s.i. less than that at which it entered, the $C_{3+}$ laden regeneration gas is ducted through valve F-71 to a junction F-118. At junction F-118, the regeneration gas splits into two approximately equal flow streams, one of which enters valved line 113 and passes therefrom into a portion of the G group of equipment while the remaining portion of the regeneration gas moves to atmospheric cooler F-89 through flow line 69. On emerging from cooler F-89 at a temperature of from about 125° F. to about 150° F. and at a pressure reduced about 5 p.s.i., the stream is then introduced to the lower portion of heat exchange column F-84 and from thence to column F-83 wherein it is further cooled to a temperature of from about 80° F. to about 110° F. at a pressure about 10 p.s.i. lower than that at which it entered by heat exchange with purified tail gas from columns FS-1 and FC-1. At this temperature, the gasoline fraction, $C_5$ to $C_{7+}$, which is mixed with the regeneration gas liquefies and is carried by the flowing gas stream into gasoline separator F-91 where the liquefied gasoline falls to the bottom for subsequent removal through a valved line F-119. The now substantially pure silica gel regeneration gas passes upwardly through return conduit F-93 at a temperature of from about 80° F. to about 110° F. and at a pressure from about 750 to about 1050 and from thence into blower F-103 to complete the loop.

The portion of the impurity-laden silica gel regeneration gas which was passed into valved line 113 flow therefrom into flow line G-69, valve G-71 being closed, and from thence into atmospheric cooler G-89. Subsequently, the regeneration gas flows through gas to gas heat exchange columns G-83 and G-84 wherein the gasoline impurities in the regeneration gas are liquefied and from thence through line G-92 to gasoline separator G-91. As in the case of gasoline separator F-91, the liquefied hydrocarbon entrained in the gas stream falls to the bottom of the gasoline separator and is subsequently removed through valved line G-119. The rising, now purified, regeneration gas passes outwardly from the gasoline separator through return conduit G-93 into blower G-103. It will, of course, be understood that the temperature and pressure conditions characteristic of atmospheric cooler G-89, gas to gas heat exchange columns 83 and 84, and gasoline separator G-91 are substantially the same as the temperatures and pressure characteristics of corresponding elements of equipment in the F group.

In the present embodiment, the regeneration gas loop for the carbon-packed towers includes blower F-106 which serves to start the regeneration gas through the closed loop at a pressure of from about 790 p.s.i.g. to about 1090 p.s.i.g. Immediately downstream from blower F-106 is heated F-107 from which the carbon regeneration gas emerges at a temperature of from about 500° F. to about 600° F. at a pressure of about 10 p.s.i.g. less than that at which it entered the heater. After being heated, the regeneration gas moves outwardly through conduit F-108 and valve F-109 toward three-way valve 111. Simultaneously regeneration gas is moving outwardly from heater G-107 through conduit G-108 and valve G-109 after which it mixes with the regeneration gas flowing from heater F-107, and the two streams then pass together through three-way valve 111. After passing through valve 111, the heated regeneration gas enters three-way valve F-64 from return line F-112 and from thence passes upwardly through conduit F-63 into the upper portion of adsorption column FC-2 at a temperature from about 500° F. to about 600° F. and at a pressure from about 780 p.s.i.g. to about 1080 p.s.i.g. As the heater regeneration gas passes downwardly through column FC-2, it heats the packing within the column to a temperature of from about 450° F. to about 550° F., and in doing so, vaporizes the previously adsorbed impurities which include, among other things, the $C_3$ to $C_5$ hydrocarbons, which are then carried with the regeneration gas at a temperature of from about 450° F. to about 550° F., and at a pressure about 10 p.s.i. lower than that at which it entered FC-2, out of column FC-2 through conduit F-73 through three-way valve F-74. Valve F-74 is so positioned as to direct the flow of the impurity-laden regeneration gas toward and through three-way valve F-76 which is in turn positioned to further direct the flow of the gas into conduit F-75.

Immediately downstream from conduit F-75 and in communication therewith is an atmospheric cooler F-94 in which the impurity-laden regeneration gas is cooled until it reaches a temperature of about 110° F. to about 150° F. Subsequently, upon passing through precooler F-96, the temperature of the regeneration gas is further depressed from about 60° F. to about 90° F. At these temperatures the gas then passes into chiller F-97 wherein it is once more cooled, this time to a temperature from about 20° F. to about 40° F., at a pressure of from about 760 p.s.i. to about 1060 p.s.i. Within this latter range of temperatures the liquid petroleum gases which were picked up in column FC-2 and which, for the most part, have until the present time been in their gaseous state are liquefied and are subsequently removed as they pass into LPG separator F-98 with the flowing regeneration gas stream. Periodically these liquefied petroleum gases are withdrawn from separator F-98 through valved line F-99. The now cooled, stripped regeneration gas leaves separator F-98 through conduit 101 and is ducted back into the upper portion of precooler F-96 where it passes in heat exchange relationship with the incoming liquid-laden regeneration gas. On leaving the precooler, the purified regeneration gas stream is at a temperature of from about 60° F. to about 90° F. and at a pressure of from about 750 p.s.i.g. to about 1050 p.s.i.g. under which conditions it flows through exit line 102 and ultimately into blower F-106 by which it is returned to heater F-107.

The portion of the regeneration gas stream ducted into valved line 114 at junction F-121 passes from the valved line at junction G-121 into conduit G-75 which communicates with the interior of atmospheric cooler G-94. Upon passing through the atmospheric cooler, the regeneration gas moves through the precooler G-96, chiller G-97 and LPG separator G-98 and ultimately back to blower G-106 through exit line G-102 in the same manner and under the same conditions as set forth in the description of the operation of corresponding portions of the equipment in the F group.

After the flow conditions set forth in FIGURE 7 have continued for the desired length of time, in the present case 15 minutes, the flow pattern is re-established to achieve the next cycle of operation. For this purpose, suitable valves within the flow lines are manipulated to change the flow pattern to that shown in FIGURE 8. Since from an examination of FIGURE 8 as compared to FIGURE 7, it will be obvious to one skilled in the art as to which valves are thus manipulated, a detailed description of the necessary valving changes will not be made. In general, however, it will be seen that adsorption columns FS-1 and FC-1 continue to have raw feedstock gas fed thereinto, so that the adsorb cycle for these two beds is continued without interruption. Additionally, adsorption columns GS-1 and GC-1 which were being cooled by tail gas in the last step of the cycle are now placed on stream and, as indicated, are in the first half of the adsorb cycle. Moreover the tail gas from columns GS-1 and GC-1 is now ducted to adsorption columns FS-2 and FC-2 which were thermally regenerated in the last step of operation of this equipment. Adsorption columns GS-2 and GC-2, having completed an adsorption cycle in the last step, are now undergoing thermal regeneration by the two closed regeneration gas loops. It will, of course, be understood that the conditions of temperature and pressure which characterized the various portions of the equipment during the first step in the cycle likewise characterize corresponding portions of the equipment in the second, third, and fourth steps in the cycle of the operation of the equipment.

Figure 8:
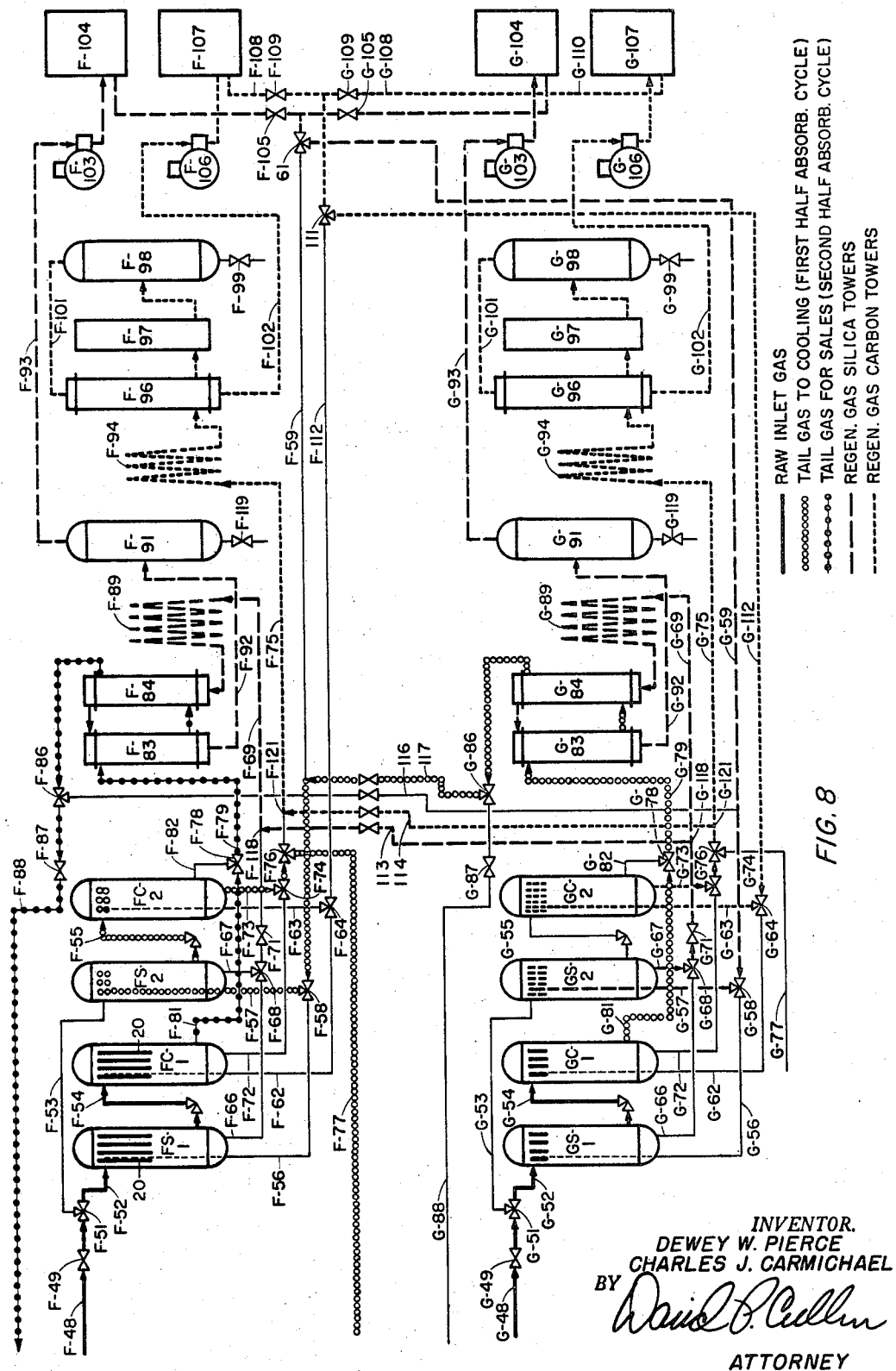
Figure 9:
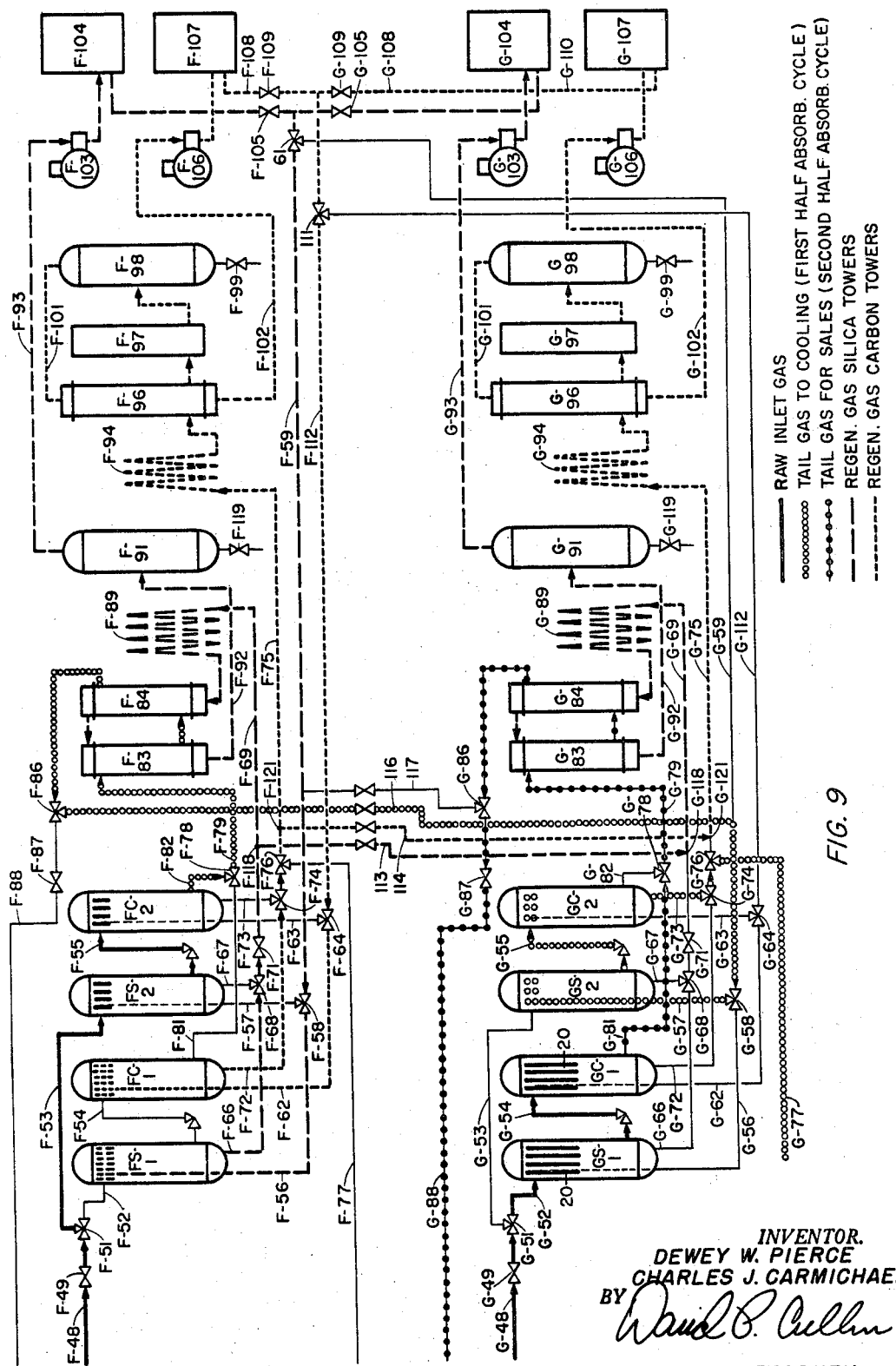

After the step in the operation cycle disclosed in FIGURE 8 has been completed, that is, in the present case after about 15 minutes, once again the valve settings are changed, this time to allow the flow pattern shown in FIGURE 9 to be established. As before, no detailed description of this flow pattern will be given in the specification inasmuch as the drawings themselves furnish the best disclosure for the operation, and further inasmuch as the detailed description of the operation of the equipment in the first step of the cycle is characteristic of the operation of the equipment in each of the steps of the cycle. It will be noted that in the third step of the cycle, adsorption beds FS-2 and FC-2 are now in the first half of the adsorb step while adsorption beds GS-1 and GC-1 are continuing with the second half of the adsorption step. Additionally, beds FS-1 and FC-1 are now undergoing thermal regeneration, while adsorption beds GS-2 and GC-2, which were thermally regenerated in the last step of the cycle, are now being cooled by tail gas from columns GS-2 and GC-2.

The flow pattern utilized in the fourth and final step of a cycle of operation of this equipment is shown in FIGURE 10. In this figure it will be noted that adsorption columns GS-2 and GC-2 have now entered the first phase of adsorption while columns FS-2 and FC-2 are continuing in the second phase of adsorption. Similarly, columns GS-1 and GC-1 are undergoing thermal regeneration while previously regenerated adsorption columns FS-1 and FC-1 are being cooled by tail gas from columns GS-2 and GC-2. It will be understood that the flow conditions shown in FIGURE 10 are established after 15 minutes have elapsed from the start of step three.

*Example*

A description of the operation of the apparatus shown in FIGURES 6–10 has, up until the present time, been described in a fairly general way. More particularly, the temperatures and pressures given have been given in terms of range of operative conditions rather than a specific example of a typical processing situation. For a more specific description of the operation of this equipment let it be assumed that an inlet gas stream of the composition shown in Table I is to be purified utilizing fifteen-minute treating steps with the apparatus shown in FIGURE 6. For this purpose the typical specific conditions summarized below in Table IV may be utilized. In this table the particular point of the flow diagram for which the conditions are given is indicated by the numbers assigned to the particular portion of the apparatus in the drawing. Moreover, the conditions given indicate conditions as the various gas streams leave the numbered element. It will, of course, be appreciated that the conditions thus given are not limiting in any sense but are rather exemplary. Moreover, since the temperatures and pressures at the various times in the cycle may be expected to vary, the particular values assigned to temperatures and pressures in Table IV are those values which are noted at the beginning of the flow conditions shown in FIGURE 7. The same data are applicable to each of the other three pairs of towers taken in order at the same relative time in the cycle.

TABLE IV

| Emerging From | Temperature, °F. | Pressure, p.s.i.g. | Flow Rate, MCF/D |
|---|---|---|---|
| F-52 | 66 | 900 | 87,500 |
| F-54 | 70 | 889 | 87,500 |
| F-81 | 73 | 876 | 87,500 |
| F-84 | 92 | 868 | 87,500 |
| GC-1 | 150 | 844 | 87,500 |
| GS-2 | 66 | 900 | 87,500 |
| GS-2 | 70 | 889 | 87,500 |
| GC-2 | 73 | 876 | 87,500 |
| G-84 | 92 | 844 | 87,500 |
| F-104 | 600 | 940 | 15,000 |
| FS-2 | 500 | 930 | 15,000 |
| F-89 | 200 | 915 | 15,000 |
| F-83 | 85 | 901 | 15,000 |
| F-91 | 85 | 900 | 15,000 |
| F-103 | 85 | 950 | 15,000 |
| 113 | 500 | 930 | 15,000 |
| G-89 | 200 | 915 | 15,000 |
| G-83 | 85 | 901 | 15,000 |
| G-91 | 85 | 900 | 15,000 |
| G-103 | 85 | 950 | 15,000 |
| G-104 | 600 | 940 | 15,000 |
| F-107 | 600 | 940 | 15,000 |
| FS-2 | 500 | 929 | 15,000 |
| F-94 | 120 | 926 | 15,000 |
| F-96 (to F-97) | 76 | 916 | 15,000 |
| F-97 | 36 | 904 | 15,000 |
| F-98 | 36 | 903 | 15,000 |
| F-96 (to F-102) | 80 | 900 | 15,000 |
| F-106 | 80 | 950 | 15,000 |
| 114 | 500 | 929 | 15,000 |
| G-94 | 120 | 926 | 15,000 |
| G-96 (to G-97) | 76 | 916 | 15,000 |
| G-97 | 36 | 904 | 15,000 |
| G-98 | 36 | 903 | 15,000 |
| G-96 (to G-102) | 80 | 900 | 15,000 |
| G-106 | 80 | 950 | 15,000 |

It will also be appreciated that the composition of the various gas streams within the flow diagrams will change, depending not only upon the composition of the incoming gas, but also the point in the cycle at which the composition is determined. Under present assumptions, the outlet gas from the silica gel towers may typically be expected to have the compositions shown in Table V. Upon examining this table, it will be noted that the composition of the tail gas from the silica gel tower varies from time to time within the adsorption phase. The data shown in Table V have not been derived theoretically but are rather actual observed data taken at various time intervals within the process, consequently, the composition variation from time to time does not occur uniformly. These relatively slight variations may be attributed to alterations in the composition of the inlet gas and need not be cause for undue concern.

TABLE V.—COMPOSITION OF OUTLET GAS FROM SILICA GEL TOWER, MOL. PERCENT

| Sample Time | Tail Gas Used for Cooling Silica | | | 18 min. | 23 min. | 28 min. | 30 min. |
|---|---|---|---|---|---|---|---|
| | 3 min. | 8 min. | 13 min. | | | | |
| $C_1$ | 96.88 | 96.54 | 95.95 | 95.82 | 96.36 | 96.17 | 96.16 |
| $C_2$ | 2.53 | 2.35 | 2.65 | 2.63 | 2.14 | 2.34 | 2.26 |
| $C_3$ | 0.52 | 0.88 | 0.99 | 1.01 | 0.95 | 0.95 | 0.97 |
| $iC_4$ | 0.05 | 0.15 | 0.23 | 0.30 | 0.29 | 0.27 | 0.28 |
| $nC_4$ | 0.02 | 0.08 | 0.16 | 0.20 | 0.21 | 0.21 | 0.24 |
| $iC_5$ | 0 | 0 | 0.02 | 0.03 | 0.04 | 0.04 | 0.07 |
| $nC_5$ | 0 | 0 | 0 | 0.01 | 0.01 | 0.02 | 0.02 |

Table VI shows the composition of outlet gas from the carbon towers at various times within the adsorption phase of the over-all cycle. As in the case of Table V, the data shown in Table VI are actual data and, consequently, minor variations may be observed therein.

TABLE VI.—COMPOSITION OF OUTLET GAS FROM CARBON TOWER, MOL. PERCENT

| Sample Time | Tail Gas Used for Cooling Carbon | | | 17 min. | 22 min. | 28 min. | 30 min. |
|---|---|---|---|---|---|---|---|
| | 2 min. | 7 min. | 12 min. | | | | |
| $C_1$ | 98.56 | 97.00 | 96.72 | 96.34 | 96.12 | 95.98 | 95.82 |
| $C_2$ | 1.36 | 2.72 | 2.80 | 2.88 | 2.84 | 2.81 | 2.83 |
| $C_3$ | 0.08 | 0.28 | 0.47 | 0.74 | 0.91 | 0.98 | 1.05 |
| $iC_4$ | 0 | 0 | 0.01 | 0.04 | 0.12 | 0.19 | 0.23 |
| $nC_4$ | 0 | 0 | 0 | 0 | 0.01 | 0.04 | 0.07 |

In the adsorption columns disclosed in FIGURES 1–5, the column packing will ordinarily consist of about 80% activated carbon, together with about 20% silica gel. While these percentages of the two elements have been found to be quite satisfactory, a relatively wide range of percentage variation may be utilized without any noticeable deleterious effect in the result obtained. For instance, good results may be obtained using from about 10 to about 50% of activated carbon with the balance being silica gel. Moreover, other materials, such as peat moss carbons and silica gel may be substituted for the activated carbon or, if necessity or expediency should demand, alternate material such as activated alumina may be utilized in the place of the silica gel. Similarly, the substitute materials may be utilized when a separate column is provided for the carbon and for the silica gel as in the equipment shown in FIGURES 6–10.

The regeneration gas which is utilized in the form of the present invention shown in FIGURES 6–10 most commonly will be natural gas; however, other materials obvious to one skilled in the art may be used with substantially equal results. Moreover, the invention disclosed and claimed herein is not limited to application to natural gas purification. Other gas systems will also suggest themselves to one skilled in the art. For instance the present invention may feasibly be used in a system where organic impurities, such as paraffin hydrocarbons, are removed from hydrogen chloride gas.

Having thus described the invention by providing specific examples thereof, it is to be understood that no undue limitations or restrictions are to be drawn by reason thereof and that many variations and modifications are within the scope of the invention.

What is claimed is:

1. The process for treating a feed stream of vaporous material by selective adsorption for the separation of a first component from a second component, wherein a plurality of adsorption means are cyclically contacted for a predetermined period of time with said feed stream, which process comprises the steps of:

(a) dividing said stream into first and second substantially equal portions,
(b) providing first, second, third, and fourth adsorption means, each comprising a silica tower and a carbon tower,
(c) contacting said first adsorption means with said first portion of feed stream to remove said first component from said second component,
(d) introducing said second portion of the feed stream to said second adsorption means after step (c) has continued for about one-half of said predetermined period of time to remove said first component from said second component,
(e) passing the effluent obtained from the first one-half of step (d) through said third adsorption means which has been previously heated as hereinafter defined in step (f), whereby said third means is cooled by vaporous material which is substantially free of said first component,
(f) contacting the silica tower and the carbon tower of said fourth adsorption means, each in a different closed heating loop, with relatively hot gas to remove said first component previously adsorbed thereon, and
(g) cooling the effluent from step (f) to recover said first component, at least a portion of said cooling being accomplished by heat exchange with the effluent resulting from step (c).

2. The process defined in claim 1 wherein the effluent from step (c) and step (d) is heat exchanged with the effluent from a silica tower undergoing step (f).

References Cited

UNITED STATES PATENTS

| 2,665,769 | 1/1954 | Walker et al. | 55—62 |
| 2,919,764 | 1/1960 | Dillman et al. | 55—62 X |
| 2,995,208 | 8/1961 | Hachmuth et al. | 55—62 X |
| 3,192,687 | 7/1965 | Silva et al. | 55—62 X |
| 3,257,772 | 6/1966 | Maddox et al. | 55—63 X |
| 3,257,773 | 6/1966 | Connors et al. | 55—62 X |

REUBEN FRIEDMAN, *Primary Examiner.*

J. ADEE, *Assistant Examiner.*